Patented Mar. 8, 1932

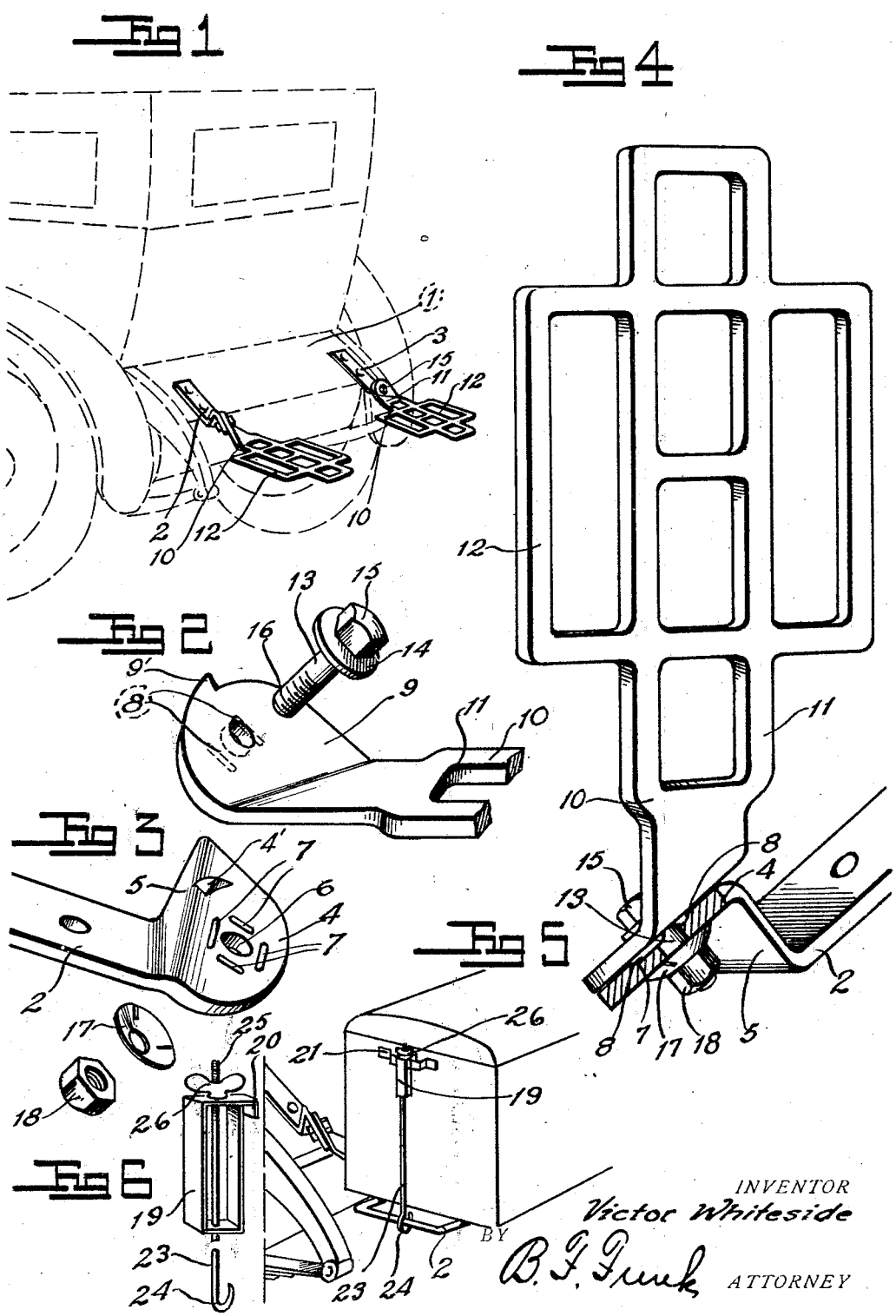

1,848,401

UNITED STATES PATENT OFFICE

VICTOR WHITESIDE, OF HUTCHINSON, KANSAS, ASSIGNOR OF ONE-HALF TO WILLIAM F. RESCHKE, OF WICHITA, KANSAS

TRUNK RACK

Application filed February 4, 1929. Serial No. 337,264.

This invention relates to folding trunk racks preferably applicable for use as a trunk rack or carrier for motor vehicles, the primary object being to provide trunk carrying supports which may be folded or swung up into vertical position when the trunk is not supported and easily swung down into functional position when it is desired to carry the trunk.

The novelty of the invention will be apparent by reference to the following description in connection with the accompanying drawings in which:

Fig. 1 is a perspective view of the invention applied.

Fig. 2 is a disassociated view of one of the movable members and the bolt for securing it to its bracket.

Fig. 3 is a like view of one end of the bracket and the spring washer and nut for the bolt, Fig. 4 is a view showing one of the movable members in vertical position, part of the bracket being shown in section.

Fig. 5 is a perspective view of one end of the trunk and the device for attaching it to the rack and Fig. 6 is a detailed view of the trunk attaching device.

I have shown a rear end of a conventional type of motor vehicle body in Figure 1 in dotted lines and I have designated the same 1. To the rear end of the motor vehicle body are two supporting bracket bars 2 and 3 each of which is provided with an offset head 4 preferably by bending or casting the head to the bar at an angle between a vertical and horizontal angle, the head being connected to the bar by a web 5. The head is provided with a bolt opening 6 and with a plurality of recesses or depressions 7 grouped about the opening 6 and adapted to receive the lugs 8 on the head 9 of the swinging carrier frame 10. The carrier frame is shown as consisting of a bar 11 having a relatively broad flat trunk receiving portion or seat 12 in the form of a skeleton frame upon which one end of the trunk can be seated. The two parts are connected by a bolt 13 on which is preferably a washer 14 to bear against the head 15 of the bolt. The threaded end 16 of the bolt receives a spring washer 17 and a nut 18, the nut being screwed on the threaded end 16 far enough to slightly compress the washer 17 so that when the parts are in the positions shown in Figure 1, the lugs 8 will be received in the recesses 7 and when the parts are in the positions shown in Figure 4, the lugs 8 will be received in the recesses 7, therefore, the trunk supporting members may be held either in a substantially vertical or a horizontal position. Each part 4 has a lug 4' against which an offset shoulder 9' on the part 9 may contact to take the strain incident to the load of the trunk. The carrier frame members 12 need not be swung to an exact vertical position. All that will be necessary is to swing the parts upwardly and forwardly usually on each side of the tire carrier so that they will not be in a horizontal plane when they are not in use. It is obvious that rivets may be used instead of the bolts 13 but in that event, the spring washers 17 could still be employed to co-operate with the recesses 7 and the lugs 8. Any means can be used for fastening the trunk to the carrier members 12, if desired, straps might be used, but in Figures 5 and 6 I have shown how the trunk may be fastened to the rack. A rectangular frame 19 is provided with an offset lip 20 to engage over the handle 21 of the trunk 22. There is a rod 23 extending loosely through the frame 19 and provided at one end with a hook 24 to engage the frame 12, the other end to the rod 23 being threaded at 25 and receiving a wing nut 26 so that the hook can be drawn into engagement with the frame 12 to co-operate with the lip 20 to hold the trunk rigid on its seat.

From the foregoing it will be seen that the trunk rack can be easily fastened to the motor vehicle and that when it is not supporting a trunk, the two movable parts may be swung to a vertical position on either side of a space, adapted to receive a tire carrier or the like.

What I claim and desire to secure by Letters Patent is:—

1. A trunk rack for motor vehicles comprising two bracket members in spaced relation, each bracket member having an offset head with a face inclined at an angle between a vertical plane and a horizontal plane, the heads being connected to the brackets by webs at substantially right angles to the brackets, swinging trunk supporting members, having ends bent at obtuse angles, lying flat against the faces of the heads, and yielding fastening means connecting the ends of the trunk supporting members to the heads of the bracket members whereby the trunk supporting members can be moved from a vertical to a horizontal plane or vice versa.

2. A trunk rack for motor vehicles comprising two bracket members in spaced relation, each bracket member having an offset head with a face inclined at an angle between a vertical plane and a horizontal plane, the heads being connected to the brackets by webs at substantially right angles to the brackets, trunk supporting members each having a face flush with the inclined face of one of the heads, a pivot bolt passing through the bracket and the associated trunk supporting member, permitting each trunk supporting member to pivot about the axis of the bolt and means for holding the trunk supporting members rigid with the brackets.

3. A trunk rack for motor vehicles comprising two bracket members in spaced relation, each bracket member having an offset head with a face inclined at an angle between a vertical plane and a horizontal plane, the heads being connected to the brackets by webs at substantially right angles to the brackets, trunk supporting members each having a face flush with the inclined face of one of the heads, a pivot bolt passing through each bracket and the associated trunk supporting member permitting the trunk supporting members to pivot about the axis of the bolts, and means for holding the trunk supporting members rigid with the brackets, said means comprising interlocking lugs and recesses between the faces of the members.

4. A trunk rack for motor vehicles comprising two bracket members in spaced relation, each bracket member having an offset head with a face inclined at an angle between a vertical plane and a horizontal plane, the heads being connected to the brackets by webs at substantially right angles to the brackets, trunk supporting members each having a face flush with the inclined face of one of the heads, a pivot bolt passing through each bracket and the associated trunk supporting member permitting the trunk supporting members to pivot about the axis of the bolts, means for holding the trunk supporting members rigid with the brackets, said means comprising interlocking lugs and recesses between the faces of the members and spring means for urging the lugs into the recesses.

5. A trunk rack assembly comprising a bracket member having its outer and bent upwardly and then downwardly, the downwardly bent portion being inclined longitudinally and laterally with respect to the body of the bracket member, a member pivoted to the downwardly projecting end, the pivoted portion being inclined with respect to the member and having a face bearing against the upper face of the downwardly inclined portion of the bracket, means for securing the bracket and the member together and complementary stop means between the bracket and the member.

In testimony whereof I affix my signature.

VICTOR WHITESIDE.